Feb. 1, 1944.  T. H. LAEHR  2,340,667
JUNCTION BOX
Filed Nov. 14, 1942
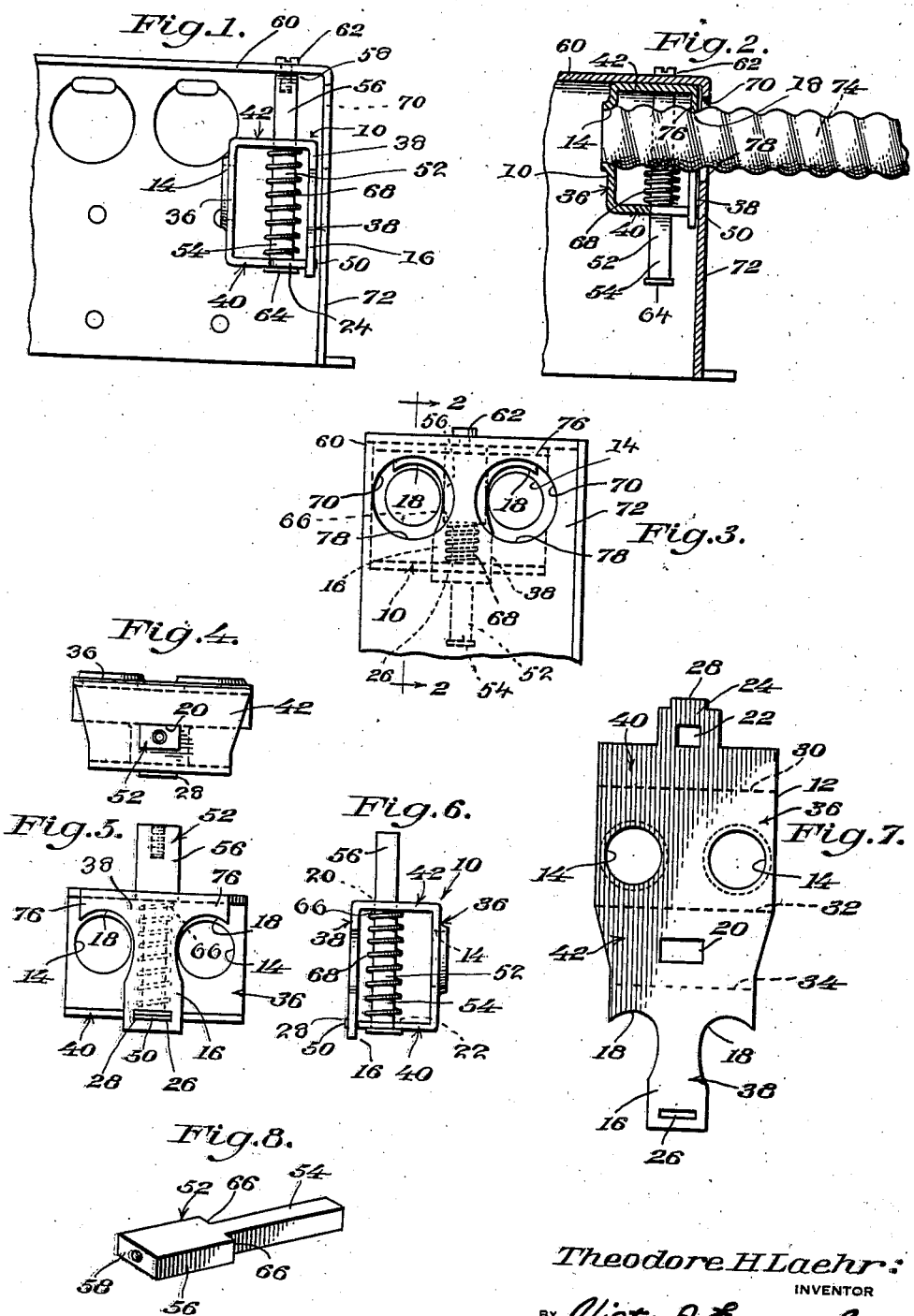
Theodore H Laehr,
INVENTOR
BY Victor J. Evans & Co.
ATTORNEYS Patented Feb. 1, 1944

2,340,667

UNITED STATES PATENT OFFICE 2,340,667

JUNCTION BOX

Theodore H. Laehr, Roseland, N. J.

Application November 14, 1942, Serial No. 465,609

1 Claim. (Cl. 285—35.1)

My invention relates to electric circuits, particularly junction or outlet boxes, and has among its objects and advantages the provision of an improved armored cable clamp.

In the accompanying drawing:

Figure 1 is a fragmentary view of an outlet box illustrating my cable clamp incorporated therein.

Figure 2 is a sectional view through the cable clamp and a portion of the outlet box illustrating an armored cable secured in the clamp.

Figure 3 is a face view of a portion of the outlet box.

Figure 4 is an end view of the cable clamp.

Figure 5 is a face view of another end of the cable clamp.

Figure 6 is a side view of the cable clamp.

Figure 7 is a plan view of a metallic blank from which the cable clamp is bent to shape, and Figure 8 is a perspective view of a guide and anchor member for the clamp.

In the embodiment of the invention selected for illustration, the clamp 10 comprises a sheet metal blank 12 having openings 14 punched therein. This blank includes a tab 16 having semicircular edges 18. Two rectangular openings 20 and 22 are respectively punched in the blank 12 and a tab 24 at the end of the blank opposite the tab 16. The latter tab is provided with a slot 26 for the reception of a lug 28 at the free end of the tab 24.

The blank 12 is bent back upon itself along lines 30, 32 and 34 to the contour of Figures 1, 2 and 6, at which time the lug 28 is disposed in the opening 26, with the walls 36 and 38 lying in parallelism and the walls 40 and 42 lying in parallelism one with the other but at right angles to the walls 36 and 38. The lug 28 may be riveted at 50 to prevent separation of the lug and the tab 16. The recesses 18 are slightly off-center with respect to the openings 14, while the openings 20 and 22 are coaxial.

A bar 52 includes a stem 54 slidable in the opening 22 and a body 56 loosely receivable in the opening 20. The end face 58 of the body 56 is clamped to the inner face of the outlet box wall 60 by a screw 62 extending through the wall 60 and threaded into the body. After assembly of the clamp 10 on the bar 52, the stem 54 is riveted at 64 to hold the clamp in assembled relationship with the bar.

Between the wall 40 of the clamp 10 and the shoulders 66 on the bar 54, is interposed a compression spring 68, this spring being mounted on the stem 54. Thus the spring 68 yieldingly urges the clamp 10 to the position of Figure 1 and at rest on the riveted stem end 64. However, the wall 42 of the clamp remains in engagement with the body 56. The clamp 10 may be moved relatively to the bar 52 from the position of Figure 1 to that of Figure 2 to bring the openings 14, and the recesses 18 into alignment with cable receiving openings 70 in the wall of the outlet box. These openings may be of the conventional knock-out type, with each wall of the outlet box provided with two or more such openings. Figures 1 and 2 illustrate the wall 38 of the clamp as being located closely to the wall 72 of the outlet box.

With the clamp 10 in the position of Figure 2, the armored cable 74 is inserted through one of the openings 70 and through one recess 18 and the aligned opening 14. The end of the cable 74 is preferably inserted in the opening 14, as in Figure 2.

The clamp 10 is then released, after which the armored cable 74 is clamped firmly in position through its engagement with the jaw 76 and the edge 78 defining the opening 70. The jaws 76 lie in parallelism with the wall 72 but are spaced sufficiently therefrom to bring the jaws and the edges or shoulders 78 in alignment with the groove in the armored cables 74, as illustrated in Figure 2. Thus the cable 74 is anchored to the outlet box and is restrained from accidental disconnection.

My invention provides a simple clamp which may be easily incorporated in outlet boxes, which clamp is devoid of set screws and other devices which are difficult to operate for cable securing purposes. Threaded devices frequently become damaged because of injury to the threads.

Without further elaboration the foregoing will so fully explain my invention, that others may, by applying current knowledge, readily adapt the same for use under various conditions of service.

I claim:

In an outlet box having a wall provided with openings, a shaft like member secured to said outlet box, a clamp slidable on said member and having jaws respectively opposing edge margins of the wall having said openings, a spring acting on said member and said clamp to press said jaws against cables inserted through said openings for clamping the cables against said edge margins, said clamp being bent from a single sheet of metal to a rectangular contour to provide four clamp walls, said member having a stem and a body, the first wall of said clamp having an opening slidably receiving said stem, the second wall of said clamp having an opening slidably receiving said body, said spring being interposed between said first wall and said body, the third wall of said clamp being provided with openings to align with said cables, and said jaws comprising curved edges on the fourth wall of the clamp.

THEODORE H. LAEHR.